(12) United States Patent
Imura

(10) Patent No.: US 7,859,663 B2
(45) Date of Patent: Dec. 28, 2010

(54) POLYCHROMETER AND METHOD FOR CORRECTING STRAY LIGHTS OF THE SAME

(75) Inventor: Kenji Imura, Toyohashi (JP)

(73) Assignee: Konica Minolta Sensing Inc., Osaka (JP)

( * ) Notice: Subject to any disclaimer, the term of this patent is extended or adjusted under 35 U.S.C. 154(b) by 176 days.

(21) Appl. No.: 12/229,687

(22) Filed: Aug. 26, 2008

(65) Prior Publication Data

US 2009/0059224 A1 Mar. 5, 2009

(30) Foreign Application Priority Data

Aug. 27, 2007 (JP) .............................. 2007-220415

(51) Int. Cl.
G01J 3/28 (2006.01)
(52) U.S. Cl. ..................... 356/307; 356/326; 356/328
(58) Field of Classification Search ................. 356/307, 356/326, 328
See application file for complete search history.

(56) References Cited

U.S. PATENT DOCUMENTS 5,128,549 A * 7/1992 Kaye ........................... 250/372

6,801,309 B1 * 10/2004 Nelson ......................... 356/307
6,879,395 B2 * 4/2005 Oka et al. .................... 356/326

FOREIGN PATENT DOCUMENTS

| JP | 60-79248 | * | 5/1985 |
| JP | 07-209082 | | 8/1995 |
| JP | 11-030552 | | 2/1999 |

* cited by examiner

Primary Examiner—F. L Evans
(74) Attorney, Agent, or Firm—Brinks Hofer Gilson & Lione

(57) ABSTRACT

In a polychrometer and a method for correcting stray light of the polychrometer, relative spectral (inter-pixel) distribution of stray light independent of a spectral distribution of an incident light is obtained, intensity coefficient of the stray light is calculated according to spectral (inter-pixel) distribution of the incident light, spectral (inter-pixel) distribution of the stray light included in a spectral (inter-pixel) distribution of an incident light is estimated and corrected. Thus, the stray light can be more accurately corrected as compared with a conventional case where stray light distribution is directly estimated from an incident light.

8 Claims, 9 Drawing Sheets

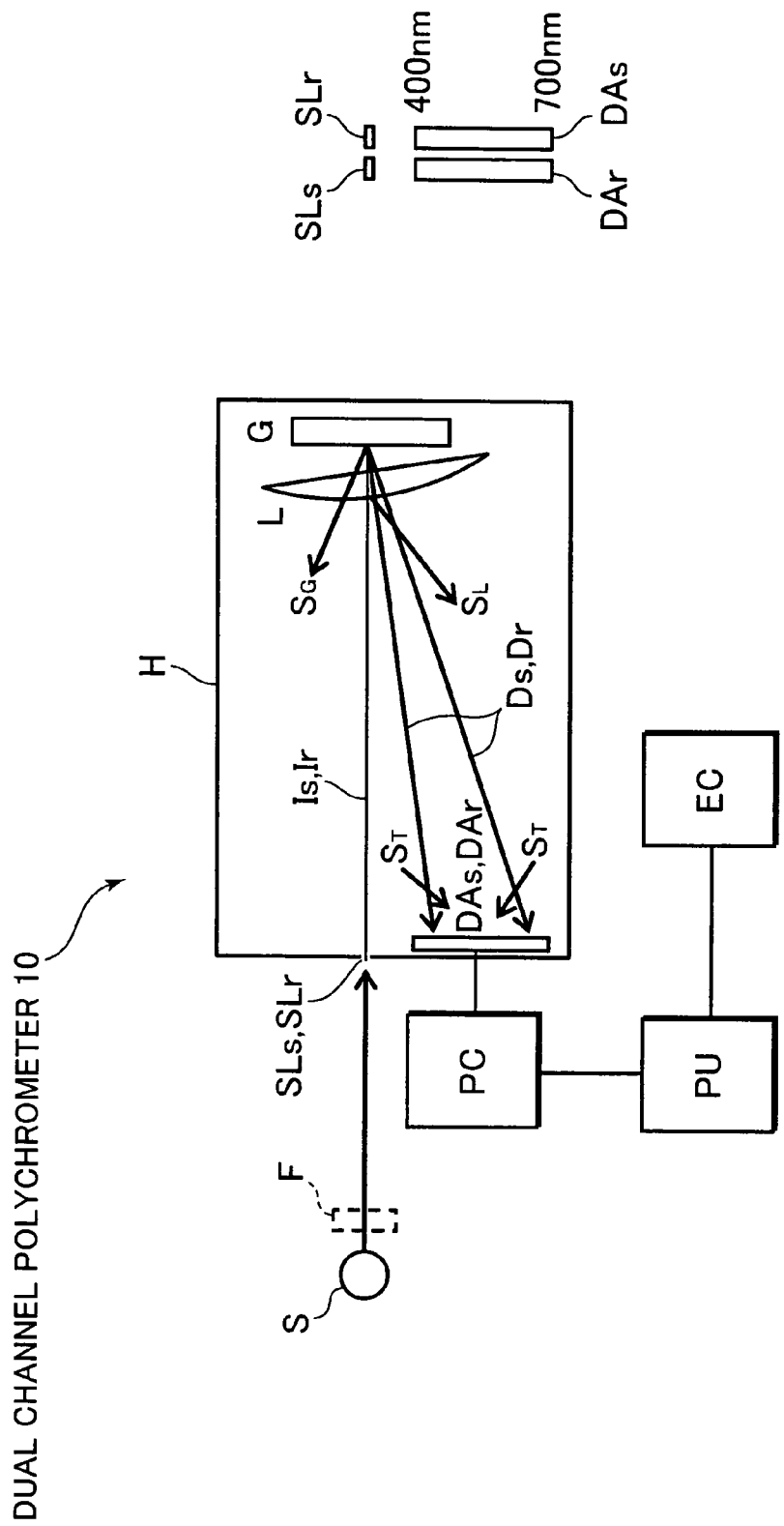

PRIOR ART

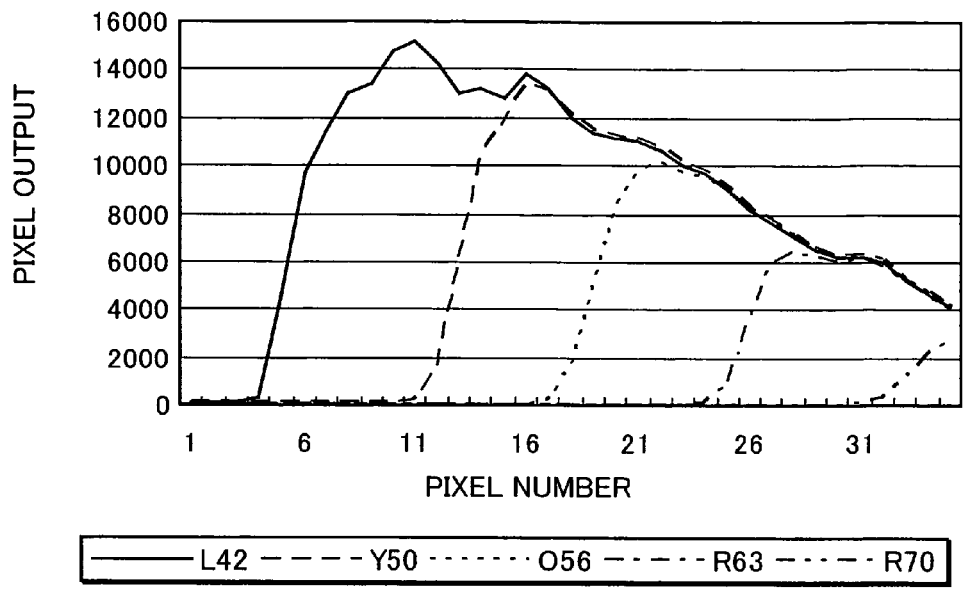
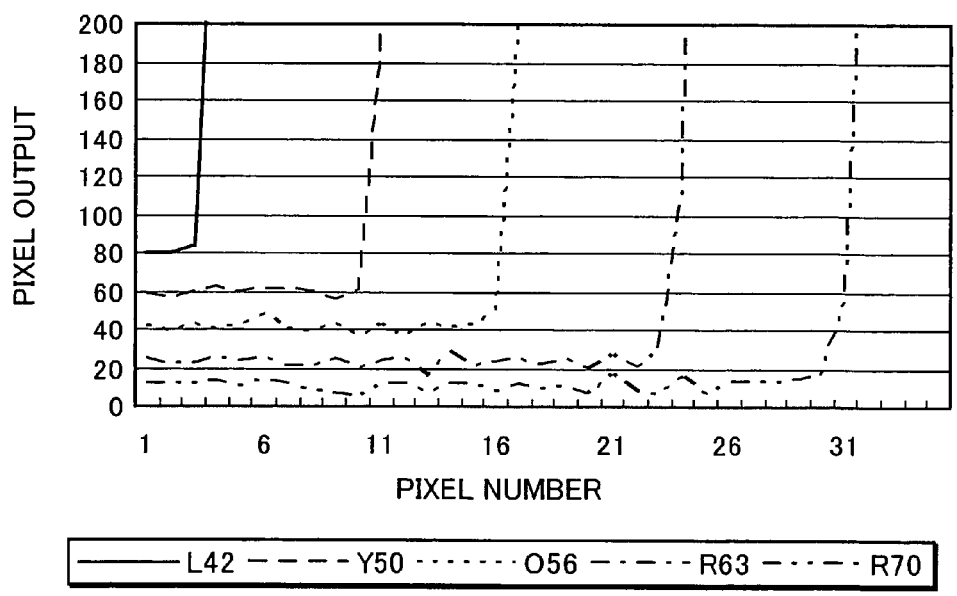

POLYCHROMETER AND METHOD FOR CORRECTING STRAY LIGHTS OF THE SAME

This application is based on Japanese Patent Application No. 2007-220415 filed on Aug. 27, 2007, the contents of which are hereby incorporated by reference.

BACKGROUND OF THE INVENTION

1. Field of the Invention

The present invention relates to a polychrometer for measuring a spectral intensity distribution of a measurement light to be measured and a spectral reflection characteristic of a measurement sample to be measured, and a method for correcting stray light.

2. Description of the Background Art

A polychrometer for simultaneously measuring spectral intensities at all wavelengths of a measurement wavelength range is widely used as spectral means of a spectrophotometer (spectral intensity measuring apparatus) for measuring a spectral intensity distribution of a measurement light and a spectrocolorimeter (spectral reflection characteristic measuring apparatus) for measuring a spectral reflection characteristic of a sample because of its features of having high measurement efficiency and being able to measure an instant light. FIG. 6 is a section showing a schematic construction of a standard polychrometer 1. A beam I incident on an incident slit from a light source S is converted into a parallel beam by a lens L to be incident on a diffraction grating G, thereby being diffused and reflected, and a diffused image (diffused image by $1^{st}$-order diffracted lights D in the example of FIG. 6) of the incident slit SL is formed and gathered on a sensor array DA by the lens L. The sensor array DA includes, for example, 35 pixels having pixel numbers n=1 to 35 and covers a wavelength range of 380 to 720 nm.

In such a polychrometer, stray light influence measurement accuracy. FIG. 11 shows the diffraction efficiency of a typical diffraction grating for $1^{st}$-order diffracted lights. This diffraction grating is set such that diffraction efficiency is higher at a short wavelength side since the sensitivities of silicon sensors such as CCDs or CMOSs used in the sensor array DA are higher at a long wavelength side. Thus, in the case of using this diffraction grating as the diffraction grating G of the polychrometer 1 shown in FIG. 6, 70% of the incident light is incident on the sensor array DA as $1^{st}$-order diffracted lights at 400 nm and 40% of the incident light is incident thereon as $1^{st}$-order diffracted lights at 700 nm, but diffracted lights other than the $1^{st}$-order diffracted lights become stray light. In other words, a ratio of a 700 nm component of the incident light to become stray light is about twice as large as a 400 nm component thereof.

Accordingly, in Japanese unexamined Patent Publications No. H11-30552 (D1) and No. H07-209082 (D2), an output distribution of a wavelength range distant from a center wavelength when a single-wavelength light is incident is used as a stray light distribution for an incident light having the wavelength of the single-wavelength light, matrix data indicating stray light distribution for incident lights of wavelengths in a measurement wavelength range is obtained beforehand from stray light distribution obtained for a plurality of single-wavelength lights, and a stray light distribution by an actual measurement light is estimated and corrected based on a spectral distribution of the actual measurement light and the matrix data.

With the above conventional technology, in order to obtain the matrix data, it is necessary to measure outputs at the respective wavelengths of the stray light range where the single-wavelength lights having low energy are incident at only small ratios. It takes time and cost to obtain necessary accuracy.

DISCLOSURE OF THE INVENTION

In view of the above situation, an object of the present invention is to provide a polychrometer capable of correcting stray light with sufficient accuracy based on easily obtainable information and a method for correcting stray light of the polychrometer.

In a polychrometer and a method for correcting stray light of the polychrometer, relative spectral (inter-pixel) distribution of the polychrometer independent of a spectral distribution of an incident light is obtained, intensity coefficient of the stray light is calculated according to spectral (inter-pixel) distribution of the incident light, and spectral (inter-pixel) distribution of the stray light included in a spectral (inter-pixel) distribution of an incident light is estimated and corrected. Thus, according to the polychrometer and the method for correcting stray light of the polychrometer according to the present invention, the stray light can be more accurately corrected as compared with a conventional case where stray light distribution is directly estimated from an incident light.

These and other objects, features, aspects and advantages of the present invention will become more apparent upon a reading of the following detailed description with reference to accompanying drawings.

BRIEF DESCRIPTION OF THE DRAWINGS

FIG. 1 is a block diagram showing a dual channel polychrometer as a polychrometer according to one embodiment, FIG. 8 is a graph showing a measurement result of pixel outputs of filter transmitted lights shown in FIG. 7, FIG. 9 is a graph enlargedly showing stray light parts of FIG. 8.

BEST MODES FOR EMBODYING THE INVENTION

Figure 2A:
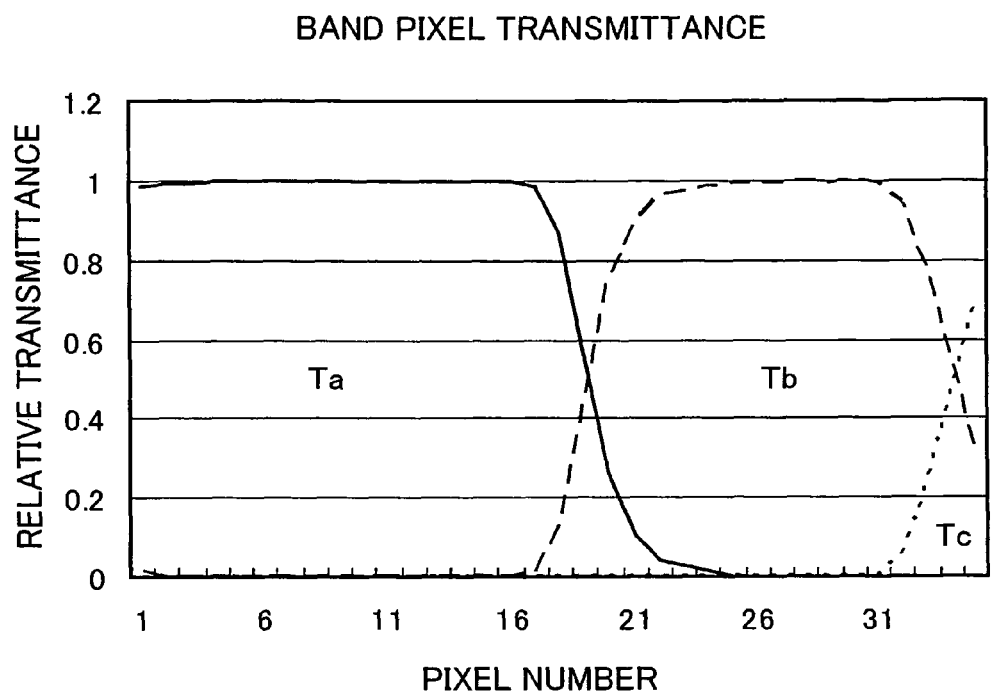
FIG. 2 is a graph showing an example of a band pixel transmittance used in the embodiment.

Hereinafter, embodiments of the present invention are described with references to the accompanying drawings. It should be noted that constructions identified by the same reference numerals in the respective drawings are the same constructions and are not repeatedly described.

First Embodiment

FIG. 1 is a block diagram of a dual channel polychrometer 10 as a polychrometer according to one embodiment. In this dual channel polychrometer 10, beams I (Is, Il) incident on incident slits SL (SLs, SLr) from a light source S are roughly converted into parallel beams by a lens L to be incident on a diffraction grating G, thereby being diffused and reflected, and diffused images of the incident slits SL (SLs, SLr) are formed and gathered on sensor arrays DA (DAs, DAr) by the lens L. Each sensor array DA (DAs, DAr) includes, for example, 35 pixels having pixel numbers n=1 to 35 and covers a wavelength range of 380 to 720 nm.

This dual channel polychrometer 10 is used as a spectral portion of a spectrocolorimeter (spectral reflection characteristic measuring apparatus) for illuminating a sample and measuring a spectral reflection coefficient of the sample. Thus, this dual channel polychrometer 10 is provided with two optical systems: a sample channel (hereinafter, S-channel) for reflected light (sample light) from the sample and a reference channel (hereinafter, R-channel) for illumination light, and the S-channel incident slit SLs and the R-channel incident slit SLr and the S-channel sensor array DAs and the R-channel sensor array DAr corresponding thereto are mounted in the depth direction of the plane of FIG. 1A with the positions thereof switched as shown in FIG. 1B.

By this construction, the sample light Is and the illumination light Ir incident through the S-channel incident slit SLs and the R-channel incident slit SLr are respectively converted into parallel beams by the lens L to be incident on the diffraction grating G, thereby being diffused and reflected. Out of the diffused lights, $1^{st}$-order diffused images of the incident slits SLs, SLr are formed from $1^{st}$-order diffused lights Ds, Dr by the lens L and incident on the S-channel sensor array DAs and the R-channel sensor array DAr, thereby being respectively converted into pixel signals. The pixel signals of both channels are inputted to an arithmetic control unit PU as S-channel and R-channel pixel distribution outputs via a processing circuit PC. The arithmetic control unit PU applies a known process to the inputted pixel distribution outputs of both channels and outputs them after converting them into a spectral characteristic of the sample such as the spectral reflection coefficient.

In this case, parts of the S-channel and R-channel incident lights Is, Ir become stray light in the dual channel polychrometer 10 as described above and are incident on the S-channel sensor array DAs and the R-channel sensor array DAr to become errors of a spectral characteristic measurement value of the sample. Here, the stray light originating from the illumination light Ir as the R-channel incident light can be corrected by so-called dark calibration without large errors since the illumination light Ir is constant without depending on the sample. The dark calibration is such that pixel signals of S-channel are measured in the absence of the sample (should really be 0) beforehand and used as stray light of S-channel and R-channel.

On the contrary, stray light originating from the sample light Is as the S-channel incident light cannot be obtained beforehand unlike those originating from the illumination light Ir since the sample light Is depends on the sample. The purpose of this embodiment is to correct the stray light originating from this sample light Is (S-channel incident light), and the correction of the respective stray light of S-channel and R-channel originating from the sample light Is is described.

Figure 6:
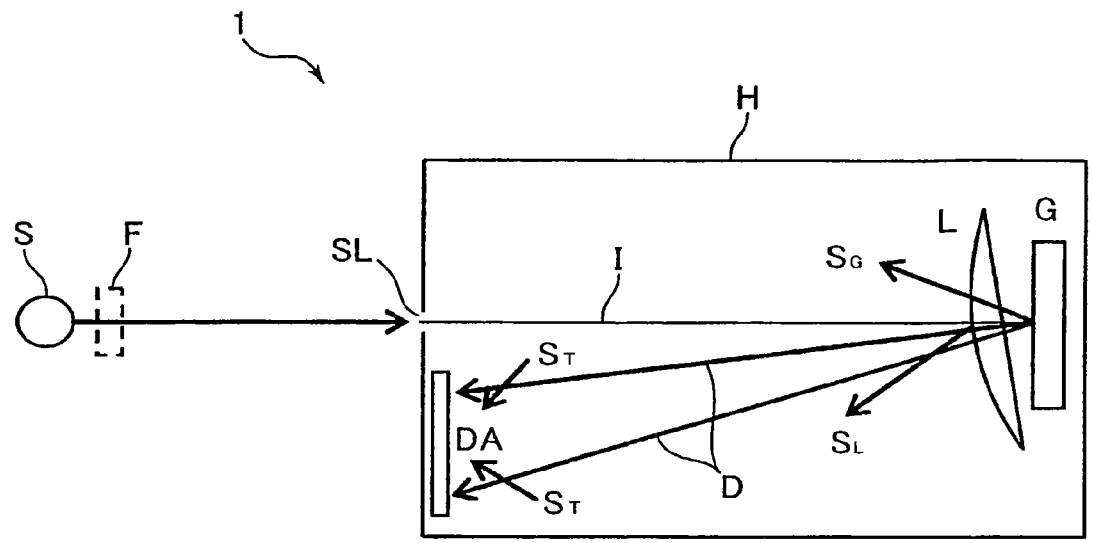
FIG. 6 is a section showing a schematic construction of a standard polychrometer.
Figure 7:
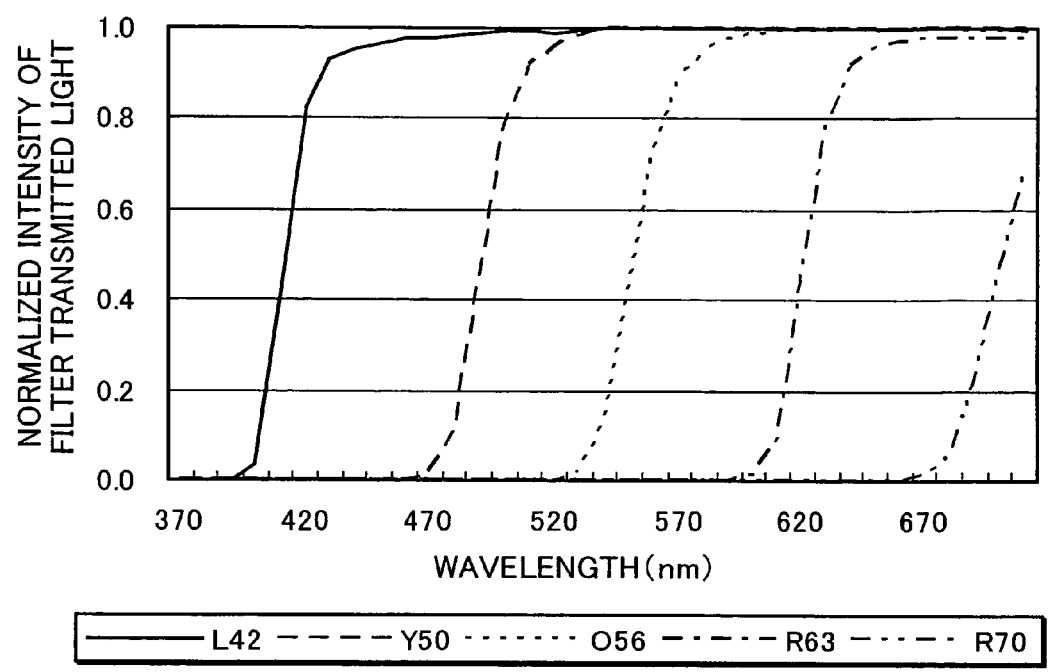
FIG. 7 is a graph showing a spectral transmittance of a sharp-cut long-pass filter used in a stray light measurement.

Upon the above correction, the cause of the stray light was investigated as follows. First of all, when pixel outputs of the sensor arrays DA in the case where sharp-cut long-pass filters (color glass filters) L42, Y40, O56, R63 and R70 having spectral transmittances (normalized by the transmittance of transparent glass) shown in FIG. 7 and TABLE-1 are inserted in the incident beam on the above polychrometer 1 as shown by reference numeral F in FIG. 6 were seen, outputs by the stray light were observed in pixels corresponding to wavelengths, at which no transmitted lights should be present (where the outputs should be 0, substantially flat parts as noise floors appearing in FIG. 9). In other words, lights of such wavelength components are incident as stray light on the pixels other than those where they should be incident. The stray light is larger as the cutoff wavelengths of the filters are shorter, i.e. as a transmission wavelength range is wider.

TABLE 1

| WAVELENGTH | FILTER | | | | |
|---|---|---|---|---|---|
| (nm) | L42 | Y50 | O56 | R63 | R70 |
| 370 | 0.000 | 0.000 | 0.000 | 0.000 | 0.000 |
| 380 | 0.000 | 0.000 | 0.000 | 0.000 | 0.000 |
| 390 | 0.000 | 0.000 | 0.000 | 0.000 | 0.000 |
| 400 | 0.036 | 0.000 | 0.000 | 0.000 | 0.000 |
| 410 | 0.419 | 0.000 | 0.000 | 0.000 | 0.000 |
| 420 | 0.825 | 0.000 | 0.000 | 0.000 | 0.000 |
| 430 | 0.928 | 0.000 | 0.000 | 0.000 | 0.000 |
| 440 | 0.953 | 0.000 | 0.000 | 0.000 | 0.000 |
| 450 | 0.965 | 0.000 | 0.000 | 0.000 | 0.000 |
| 460 | 0.975 | 0.000 | 0.000 | 0.000 | 0.000 |
| 470 | 0.975 | 0.012 | 0.000 | 0.000 | 0.000 |
| 480 | 0.980 | 0.112 | 0.000 | 0.000 | 0.000 |
| 490 | 0.989 | 0.456 | 0.000 | 0.000 | 0.000 |
| 500 | 0.992 | 0.780 | 0.000 | 0.000 | 0.000 |
| 510 | 0.992 | 0.920 | 0.000 | 0.000 | 0.000 |
| 520 | 0.990 | 0.961 | 0.000 | 0.000 | 0.000 |
| 530 | 0.993 | 0.984 | 0.015 | 0.000 | 0.000 |
| 540 | 1.000 | 1.000 | 0.134 | 0.000 | 0.000 |
| 550 | 1.001 | 1.000 | 0.444 | 0.000 | 0.000 |
| 560 | 1.000 | 1.000 | 0.737 | 0.000 | 0.000 |
| 570 | 1.001 | 1.000 | 0.893 | 0.000 | 0.000 |
| 580 | 1.002 | 1.000 | 0.955 | 0.000 | 0.000 |
| 590 | 1.000 | 1.000 | 0.975 | 0.000 | 0.000 |
| 600 | 1.001 | 1.000 | 0.987 | 0.012 | 0.000 |
| 610 | 1.001 | 1.000 | 0.994 | 0.105 | 0.000 |
| 620 | 1.000 | 1.000 | 0.994 | 0.441 | 0.000 |
| 630 | 1.001 | 1.000 | 0.997 | 0.783 | 0.000 |
| 640 | 1.001 | 1.000 | 0.999 | 0.919 | 0.000 |
| 650 | 0.999 | 1.000 | 0.996 | 0.957 | 0.000 |
| 660 | 1.000 | 1.000 | 0.998 | 0.970 | 0.003 |
| 670 | 0.998 | 1.000 | 0.998 | 0.974 | 0.009 |
| 680 | 0.999 | 1.000 | 0.999 | 0.976 | 0.058 |
| 690 | 0.997 | 1.000 | 0.997 | 0.975 | 0.218 |
| 700 | 0.997 | 1.000 | 0.996 | 0.975 | 0.465 |
| 710 | 0.996 | 1.000 | 0.997 | 0.974 | 0.689 |

The dominant cause of these stray light can be presumed to be reflected lights $S_L$ and diffused/reflected lights $S_G$ (other than the $1^{st}$-order diffracted lights, i.e. $0^{th}$-order, $-1^{st}$-order, $\pm 2^{nd}$-order, ... diffracted lights, and $1^{st}$-order diffracted lights in a wavelength range not to be incident on the sensor arrays DA) of the diffraction grating G not to be incident on the sensor arrays DA on the two surfaces of the lens L.

Figure 10:
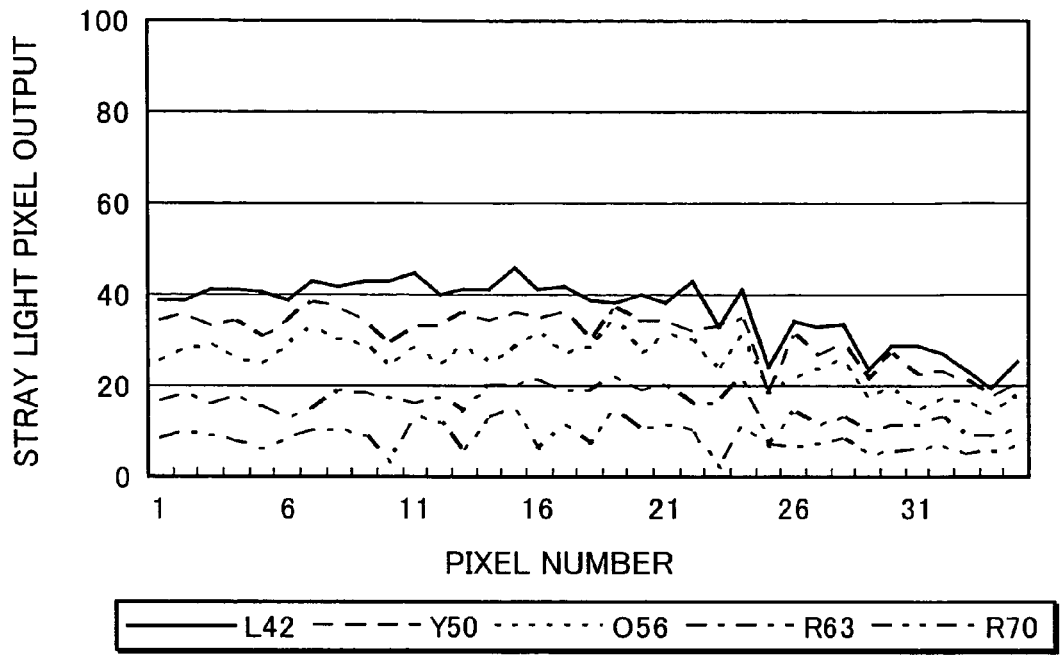
FIG. 10 is a graph showing a measurement result of pixel distribution of stray light.
Figure 11:
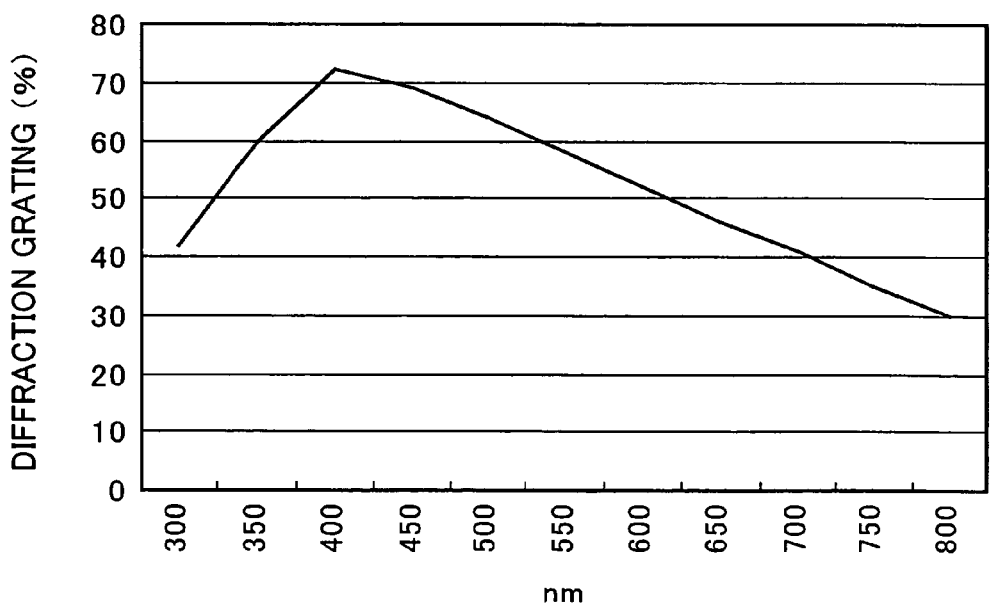
FIG. 11 is a graph showing diffraction efficiency for $1^{st}$-order diffracted lights of a typical diffraction grating.

These components are incident as stray light $S_T$ on the sensor arrays DA after being attenuated through multiple reflection by the inner wall (normally, black) of a housing H of the polychrometer 1. Pixel-to-pixel distribution of the stray light incident on the sensor arrays DA depend on the reflection characteristic and diffusion characteristic of the inner wall surface of the housing H. The inner wall surface of the housing H is normally a black smooth surface in order to suppress reflection and diffusion, and the wavelength dependencies of the refection characteristic and diffusion characteristic are small. Accordingly, relative distribution (relative pixel distribution) of the stray light incident on the respective pixels of the sensor arrays DA hardly depend on the spectral distribution of the incident light. FIG. 10 shows pixel distribution of the stray light on the pixels 1 to 35 (corresponding to 380 to 720 nm) of the sensor array DA by the incident lights having passed through the sharp-cut long-pass filters F (L42, Y40, O56, R63, R70). As is clear from FIG. 10, the pixel distribution of this stray light can be understood to be relatively similar.

On the other hand, the efficiency of the incident light to become stray light depends on the wavelengths. A main cause of this is the diffraction efficiency of the diffraction grating described with reference to FIG. 1 for the $1^{st}$-order diffracted lights. When the stray light outputs of the sensor arrays DA are considered, the spectral sensitivities of the sensor arrays DA also become the cause.

From the above, the stray light of the polychrometer 1 have the following features.

i. The relative pixel distribution of the stray light hardly depend on the spectral distribution of the incident light.

ii. The intensities of the stray light depends on the spectral distribution of the incident light and the efficiencies of the incident lights of the respective wavelengths peculiar to the polychrometer 1 to become stray light (spectral stray light efficiency).

Accordingly, a stray light correction for the polychrometer 10 of this embodiment is performed as follows for pixel distribution outputs $Is_n$ and $Ir_n$ (n=pixel number of 1 to 35) of S-channel and R-channel, and the conversion of these pixel distribution outputs $Is_n$, $Ir_n$ into the spectral distribution is performed for the pixel outputs to which the stray light correction was performed.

First of all, as described above, the relative pixel distribution of the stray light of the polychrometer do not depend on the spectral distribution of the incident light and can be approximated by standard pixel distribution (hereinafter, standard stray light distribution) $S0_n$. Further, the intensities of the stray light depend on the spectral distribution of the incident light and the spectral stray light efficiencies and, hence, depend on corresponding pixel distribution and the pixel stray light efficiencies of the incident light. The pixel stray light efficiencies depend on the diffraction efficiency of the diffraction grating G, the spectral reflection characteristics of the lens L, the spectral sensitivities of the sensor arrays DA and the like. Here, if the pixel stray light efficiencies are moderate, sufficient accuracy can be obtained for the correction of the stray light originally having low levels even if the pixel stray light efficiencies are replaced by stray light efficiencies (hereinafter, "band stray light efficiencies") $Es_B$, $Er_B$ (B is a band number) into the S-channel and R-channel of a relative wide wavelength band, i.e. a pixel band (band).

From the above, pixel distribution (hereinafter, stray light distribution) $Ss_n$, $Sr_n$ of stray light to the S-channel and R-channel by an arbitrary incident light (sample light) Is producing the S-channel pixel distribution output $Is_n$ are respectively given by products of the standard stray light distribution $S0_n$ and coefficient (hereinafter, stray light intensity coefficient) Ks, Kr for giving stray light intensities to the S-channel and R-channel by the entire incident light Is as follows.

$$Ss_n = Ks \cdot S0_n \quad (1)$$

$$Sr_n = Kr \cdot S0_n \quad (2)$$

Here, the stray light intensity coefficient Ks, Kr are respectively given by the following Equations (3), (4) using a total incident amount (hereinafter, integrated band input) $A_B$ in the respective bands of the incident light and band stray light coefficient $Es_B$, $Er_B$ to the S-channel and R-channel. Thus, the stray light distribution $Ss_n$, $Sr_n$ of the S-channel and R-channel are respectively given by the following Equations (5), (6).

$$Ks = \Sigma_B(A_B \cdot Es_B) \quad (3)$$

$$Kr = \Sigma_B(A_B \cdot Er_B) \quad (4)$$

Here, $\Sigma_B$ is the integrated value for the band B.

$$Ss_n = S0_n \cdot \Sigma_B(A_B \cdot Es_B) \quad (5)$$

$$Sr_n = S0_n \cdot \Sigma_B(A_B \cdot Er_B) \quad (6)$$

Accordingly, the stray light corrections for the pixel distribution outputs $Is_n$, $Ir_n$ of the S-channel and R-channel can be made by subtracting the stray light distribution $Ss_n$, $Sr_n$ to obtain corrected pixel distribution $Is'_n$, $Ir'_n$ as expressed by the following Equations (7), (8).

$$Is'_n = Is_n - Ss_n \quad (7)$$

$$Ir'_n = Ir_n - Sr_n \quad (8)$$

Thus, at the time of calibrating the polychrometer 10, the standard stray light distribution $S0_n$, the band stray light efficiencies $Es_B$, $Er_B$, and the band pixel transmittance $T_{B,n}$ necessary for the calculation of a band integrated input $A_B$ are calculated and stored in the arithmetic control unit PU by an external processing unit EC connected to the arithmetic control unit PU. They are calculated as follows.

Figure 2B:
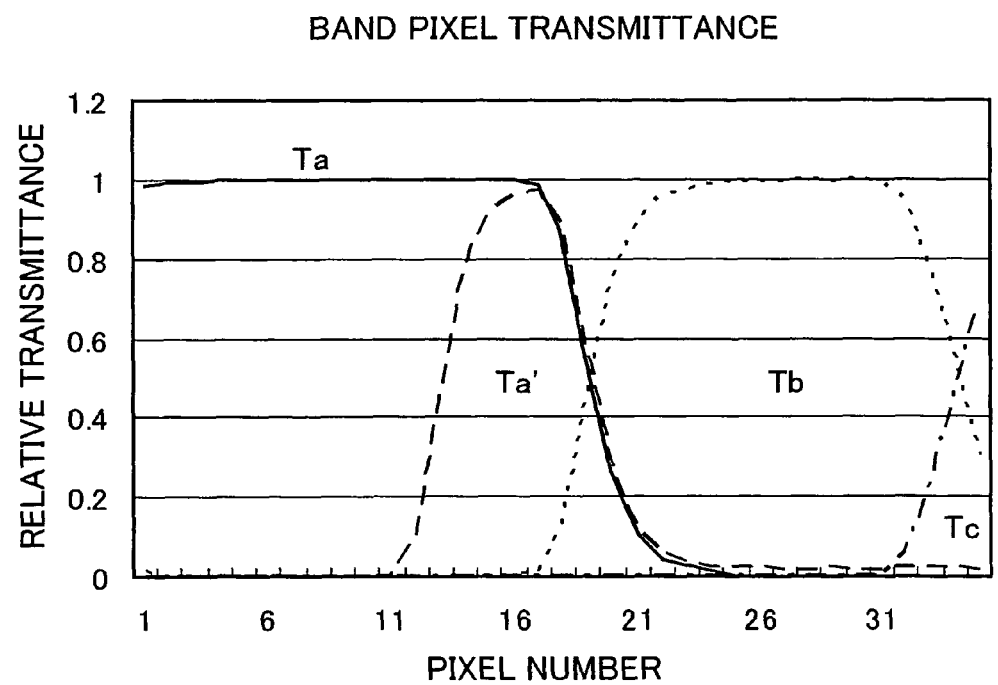

In this embodiment, the standard stray light distribution $S0_n$ is first calculated from the pixel distribution outputs $Ir_n$ of the r-channel sensor array DAr in the case where the beam Is is incident only on the S-channel incident slit SLs. Here, the pixel range is delimited by two sharp-cut long-pass filters (hereinafter, sharp-cut filters) O56, R70 having transmission characteristics shown in FIG. 7 and divided into three bands a, b and c as shown in FIG. 2A. In addition, a band a' delimited by the filters Y50, O56 is used to obtain the band stray light efficiency as shown in FIG. 2B.

Then, the transparent glass G and any one of the sharp-cut filters Y50, O56 and R70 are inserted in an incident beam from the while light source S, S-channel pixel distribution outputs $IsG_n$, $Is50_n$, $Is56_n$, $Is70_n$ and R-channel pixel distribution outputs $IrG_n$, $Ir50_n$, $Ir56_n$, $Ir70_n$ are obtained, and differences $Ds_{a,n}$, $Ds_{a',n}$, $Ds_{b,n}$, $Ds_{c,n}$ and $Dr_{a,n}$, $Dr_{a',n}$, $Dr_{b,n}$, $Dr_{c,n}$ are calculated as pixel outputs in relation to the incident lights of the above bands a, a', b, c.

$$Ds_{a,n} = IsG_n - Is56_n \quad (9\text{-}1)$$

$$Ds_{a',n} = Is50_n - Is56_n \quad (9\text{-}2)$$

$$Ds_{b,n} = Is56_n - Is70_n \quad (9\text{-}3)$$

$$Ds_{c,n} = Is70_n \quad (9\text{-}4)$$

$$Dr_{a,n} = IrG_n - Ir56_n \quad (10\text{-}1)$$

$$Dr_{a',n} = Ir50_n - Ir56_n \quad (10\text{-}2)$$

$$Dr_{b,n} = Ir56_n - Ir70_n \quad (10\text{-}3)$$

$$Dr_{c,n} = Ir70_n \quad (10\text{-}4)$$

Next, the band stray light efficiencies $Es_a$, $Es_b$, $Es_c$ of the incident lights of the respective bands a, b, c to the S-channel are calculated as follows by normalizing ratios of integrated values of the S-channel differences $Ds_{a',n}$, $Ds_{b,n}$, $Ds_{c,n}$ in the stray light pixel ranges (m=1 to 8) to integrated values thereof for all the pixels (n=1 to 35) by an integrated value of the standard stray light distribution S0 in the stray light pixel range.

$$Es_a = \Sigma_m(Ds_{a',m})/\Sigma_n(Ds_{a',n})/\Sigma_m(S0_m) \quad (11\text{-}1)$$

$$Es_b = \Sigma_m(Ds_{b,m})/\Sigma_n(Ds_{b,n})/\Sigma_m(S0_m) \quad (11\text{-}2)$$

$$Es_c = \Sigma_m(Ds_{c,m})/\Sigma_n(Ds_{c,n})/\Sigma_m(S0_m) \quad (11\text{-}3)$$

where $\Sigma_m$, $\Sigma_n$ are integrated values for the above pixels m, n. Although the stray light pixel range is set to m=1 to 8 uniformly for all the bands a, b, c here, different stray light pixel ranges may be set for the respective bands.

On the other hand, band stray light efficiencies $Er_a$, $Er_b$, $Er_c$ to the R-channel where all the pixels constitute the stray light range are calculated as follows by normalizing ratios of integrated values of the S-channel differences $Ds_{a',n}$, $Ds_{b,n}$, $Ds_{c,n}$ for all the pixels to integrated values of R-channel differences $Dr_{a',n}$, $Dr_{b,n}$, $Dr_{c,n}$ for all the pixels by an integrated value of the standard stray light distribution S0 for all the pixels.

$$Er_a = \Sigma_n(Dr_{a',n})/\Sigma_n(Ds_{a',n})/\Sigma_n(S0_n) \quad (12\text{-}1)$$

$$Er_b = \Sigma_n(Dr_{b,n})/\Sigma_n(Ds_{b,n})/\Sigma_n(S0_n) \quad (12\text{-}2)$$

$$Er_c = \Sigma_n(Dr_{c,n})/\Sigma_n(Ds_{c,n})/\Sigma_n(S0_n) \quad (12\text{-}3)$$

Further, band pixel transmittances $T_{a,n}$, $T_{b,n}$, $T_{c,n}$ of the respective bands a, b, c are calculated as follows by normalizing the differences $Ds_{a,n}$, $Ds_{b,n}$, $Ds_{c,n}$ by the pixel distribution output $IsG_n$ of the transparent glass G.

$$T_{a,n} = Ds_{a,n}/IsG_n \quad (13\text{-}1)$$

$$T_{b,n} = Ds_{b,n}/IsG_n \quad (13\text{-}2)$$

$$T_{c,n} = Ds_{c,n}/IsG_n \quad (13\text{-}3)$$

As described above, the respective parameters are calculated and stored in a storage of the arithmetic control unit PU at the time of calibration. At the time of an actual measurement, the stray light correction is performed as described below in this arithmetic control unit PU. In other words, when the pixel distribution outputs $Ir_n$ of the incident light from the sample through the R-channel and the pixel distribution outputs $Is_n$ of the incident light from the sample illuminated by the illumination light through the S-channel are respectively obtained, integrated band inputs $A_a$, $A_b$, $A_c$ are first calculated as follows from the S-channel pixel distribution outputs $Is_n$ and the stored band pixel transmittances $T_{a,n}$, $T_{b,n}$, $T_{c,n}$.

$$A_a = \Sigma_n(Is_n \cdot T_{a,n}) \quad (14\text{-}1)$$

$$A_b = \Sigma_n(Is_n \cdot T_{b,n}) \quad (14\text{-}2)$$

$$A_c = \Sigma_n(Is_n \cdot T_{c,n}) \quad (14\text{-}3)$$

Next, the stray light intensity coefficient Ks, Kr to the S-channel and R-channel by the incident light Is are calculated as follows from the integrated band inputs $A_a$, $A_b$, $A_c$ and the stored band stray light efficiencies $Es_a$, $Es_b$, $Es_c$ and $Er_a$, $Er_b$, $Er_c$ of the S-channel and R-channel.

$$Ks = A_a \cdot Es_a + A_b \cdot Es_b + A_c \cdot Es_c \quad (15)$$

$$Kr = A_a \cdot Er_a + A_b \cdot Er_b + A_c \cdot Er_c \quad (16)$$

Further, the stray light distribution $Ss_n$, $Sr_n$ of the S-channel and R-channel by the incident light Is are calculated as products of the stray light intensity coefficient Ks, Kr calculated above and the standard stray light distribution $S0_n$ as follows.

$$Ss_n = Ks \cdot S0_n \quad (17)$$

$$Sr_n = KR \cdot S0_n \quad (18)$$

Finally, the corrected pixel distribution $Is'_n$, $Ir'_n$ are calculated as follows and these are used in the following process.

$$Is'_n = Is_n - Ss_n \quad (19)$$

$$Ir'_n = Ir_n - Sr_n \quad (20)$$

Figure 3:
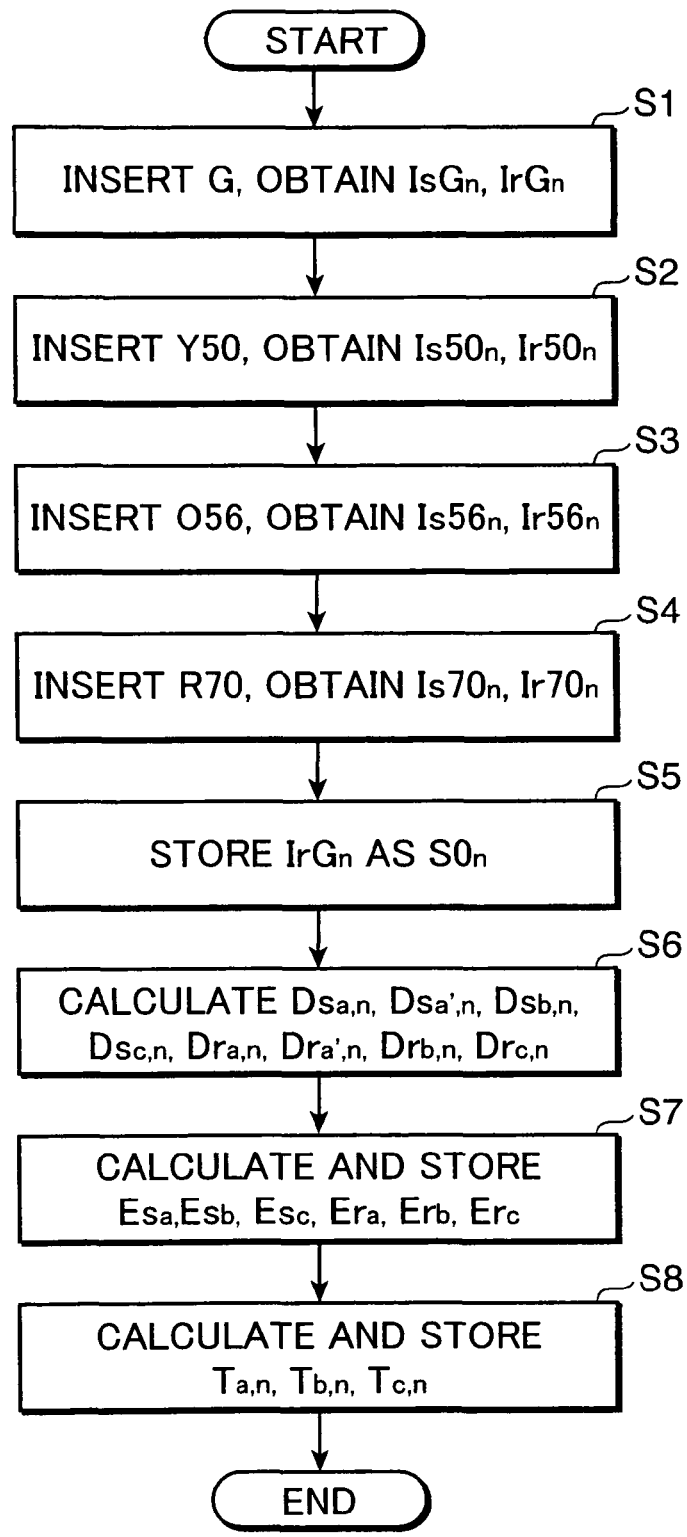
FIG. 3 is a flow chart showing a process at the time of calibration by a stray light Correction method according to one embodiment.

FIG. 3 is a flow chart showing a process of calculating correction parameters at the time of calibration. In Step S1, a glass plate is inserted in the beam I from the while light source S to cause the beam I to be incident only on the S-channel, whereby the S-channel and R-channel pixel distribution outputs $IsG_n$, $IrG_n$ are obtained. In Step S2, the Y50 filter is inserted to obtain the S-channel and R-channel pixel distribution outputs $Is50_n$, $Ir50_n$. In Step S3, the O56 filter is inserted to obtain the S-channel and R-channel pixel distribution outputs $Is56_n$, $Ir56_n$. In Step S4, the R70 filter is inserted to obtain the S-channel and R-channel pixel distribution outputs $Is70_n$, $Ir70_n$.

Thereafter, in Step S5, the R-channel pixel distribution outputs $IrG_n$ obtained when the glass plate was inserted are stored as the standard stray light distribution $S0_n$. Subsequently, in Step S6, the differences $Ds_{a,n}$, $Ds_{a',n}$, $Ds_{b,n}$, $Ds_{c,n}$ and $Dr_{a,n}$, $Dr_{a',n}$, $Dr_{b,n}$, $Dr_{c,n}$ are calculated by the above Equations (9-1) to (9-4) and (10-1) to (10-4). In Step S7, the band stray light efficiencies $Es_a$, $Es_b$, $Es_c$ and $Er_a$, $Er_b$, $Er_c$ are calculated by the Equations (11-1) to (11-3) and (12-1) to (12-3) and stored. Thereafter, in Step S8, the band pixel transmittances $T_{a,n}$, $T_{b,n}$, $T_{c,n}$ are calculated by the Equations (13-1) to (13-3) and stored.

Figure 4:
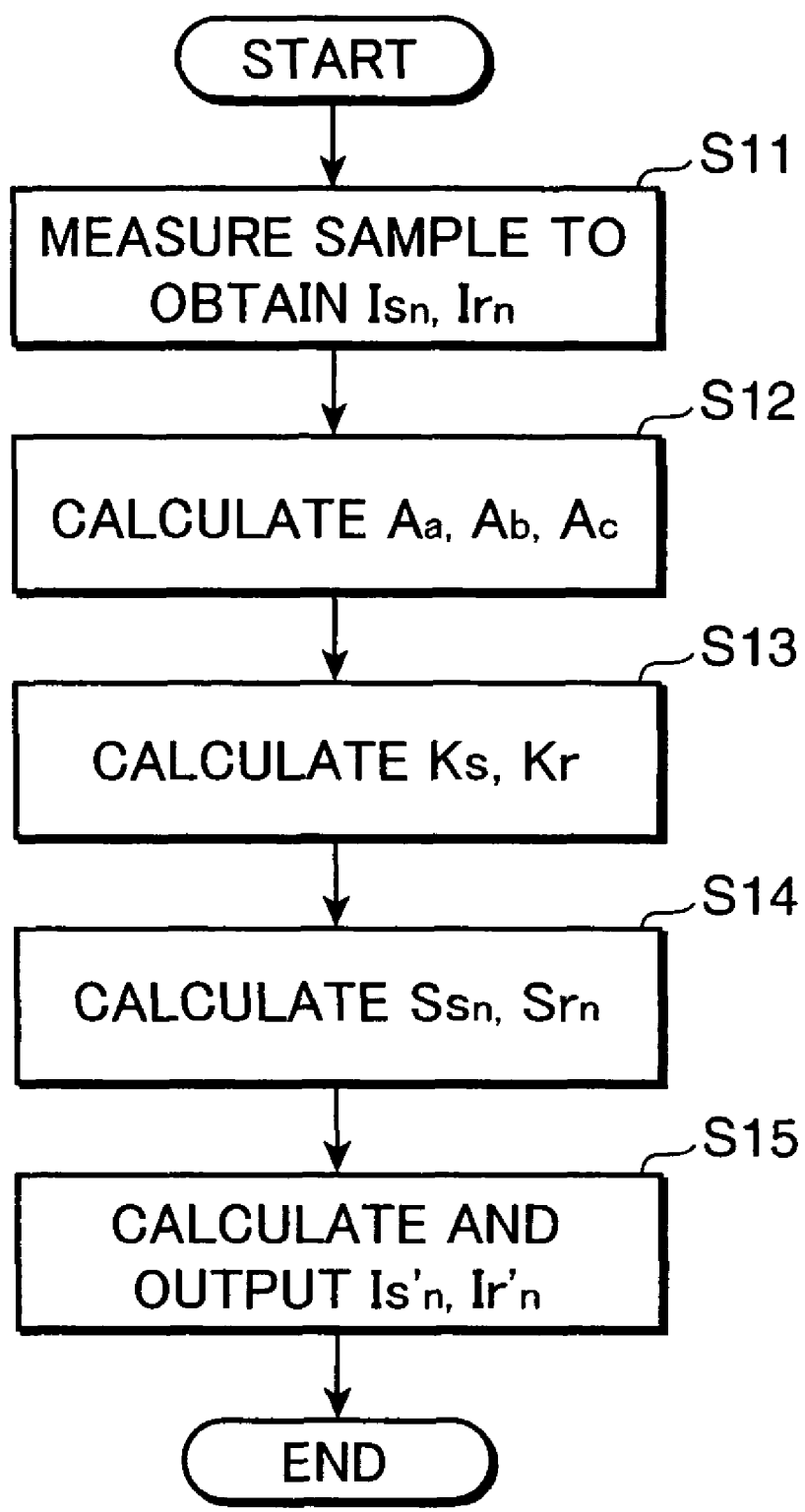
FIG. 4 is a flow chart showing a process at the time of an actual measurement by the stray light correction method according to the embodiment.

FIG. 4 is a flow chart showing a stray light correction process at the time of a measurement. In Step S11, a sample is illuminated to obtain the S-channel and R-channel pixel distribution outputs $Is_n$, $Ir_n$. In Step S12, the integrated band inputs $A_a$, $A_b$, $A_c$ are calculated by the Equations (14-1) to (14-3) using the stored band pixel transmittances $T_{a,n}$, $T_{b,n}$, $T_{c,n}$. In Step S13, the stray light intensity coefficient Ks, Kr are calculated from the stored band stray light efficiencies $Es_a$, $Es_b$, $Es_c$ and $Er_a$, $Er_b$, $Er_c$ by the Equations (15) and (16).

Subsequently, in Step S14, the stray light distribution $Ss_n$, $Sr_n$ of the S-channel and R-channel are calculated from the stray light intensity coefficient Ks, Kr and the stored standard stray light distribution $S0_n$ by the Equations (17) and (18). Further, in Step S15, the corrected pixel distribution $Is'_n$, $Ir'_n$ are calculated by the Equations (19) and (20) and outputted.

Figure 5:
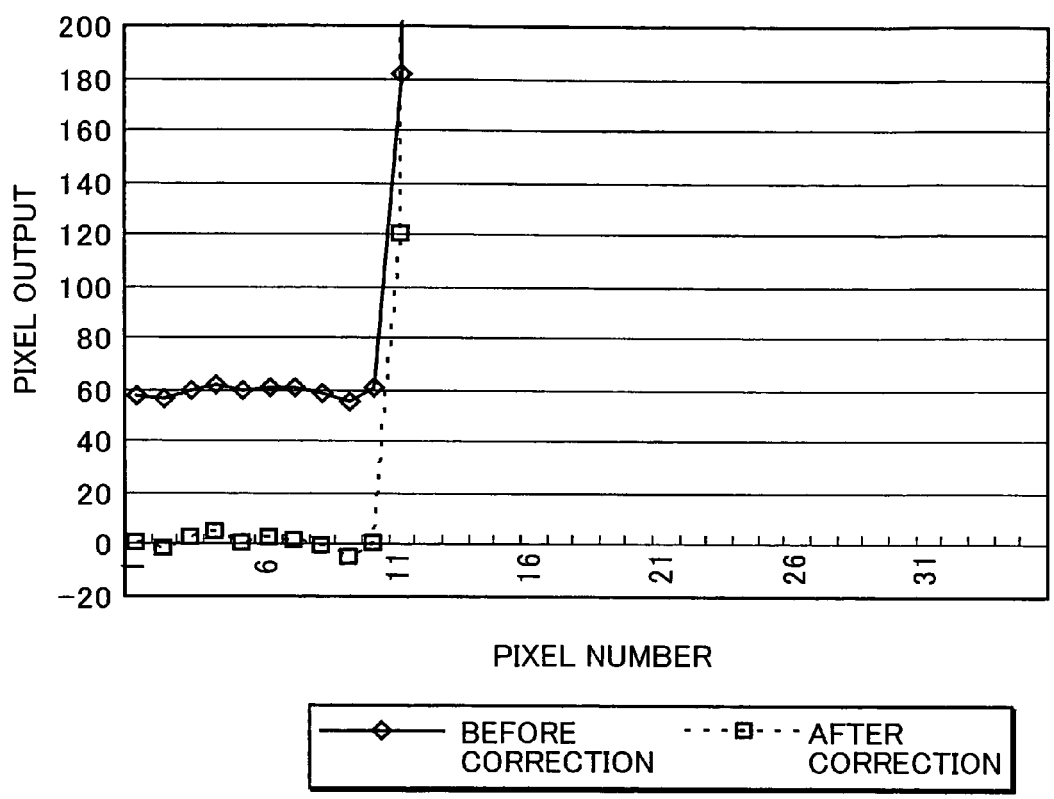
FIG. 5 is a graph showing an effect of stray light correction.

FIG. 5 is a graph showing a pixel distribution output (before correction) of a light having transmitted through the L42 filter (cutoff at 420 nm) and a corrected pixel distribution (after correction) to which the stray light correction is applied by the method of this embodiment. As can be understood from FIG. 5, stray light components which appeared like a noise floor were suppressed substantially to 0.

In the case of arranging the R-channel and S-channel sensor arrays DAr, DAs close to each other, the process for obtaining the R-channel stray light distribution can be omitted from the above process, assuming that the R-channel has the same stray light distribution as the S-channel.

Also in the case of a single channel polychrometer installed in an apparatus for measuring a beam I from the light source S without having an illumination unit, the process for obtaining the R-channel stray light distribution is similarly omitted since the R-channel does not exist. Further, in the case of the single channel polychrometer, the standard stray light distribution $S0_n$ cannot be obtained from the pixel distribution outputs of the R-channel sensor array DAr when the beam Is is incident only on the S-channel incident slit SLs as described above. Thus, it is possible to adopt a method according to which pixel distribution outputs when a beam in a wavelength range outside the detection range of the sensor array DAr, e.g. a beam having a wavelength of 760 nm or longer if the detection range is 380 to 740 nm is incident are set as standard stray light distribution, a method according to which pixel distribution outputs when a monochromatic light having a narrow half bandwidth such as a laser light is incident are set as standard stray light distribution after excluding pixels influenced by the monochromatic light and stray light levels of the pixels influenced by the monochromatic light are calculated by interpolation from stray light levels of the neighboring pixels not influenced by the monochromatic light, or a like method.

As described above, the dual channel polychrometer 10 of this embodiment obtains the standard stray light distribution $S0_n$ independent of the spectral (pixel) distribution of the incident lights in Steps S1, S5, calculates the stray light intensity coefficient Ks, Kr calculated according to the spectral (pixel) distribution outputs of the incident lights in Steps S6 to S8, S11 to S13, and then estimates the stray light distribution $Ss_n$, $Sr_n$ included in the spectral (pixel) distribution outputs of the measurement light and corrects the pixel distribution outputs $Is_n$, $Ir_n$ of the measurement light into $Is'_n$, $Ir'_n$ in step S14 upon calculating the spectral intensities of the respective wavelength components by separating the sample lights Is as the measurement light and the illumination light Ir into a plurality of wavelength components by the diffraction grating G and receiving the respective wavelength components by the sensor arrays DAs, DAr each constituted by a plurality of pixels. Accordingly, this dual channel polychrometer 10 can estimate the stray light distribution produced by the incident lights based on the standard stray light distribution $S0_n$ and the intensity coefficient Ks, Kr obtained with accuracy at a sufficient signal level.

Further, since the correction process is applied to the pixel distribution outputs, a highly accurate stray light correction can be performed by a simple process unaccompanied by a pixel-wavelength conversion.

Furthermore, the light receiving pixel areas of the sensor arrays DAs, DAr are divided into the specified bands a, b, c and the stray light intensity coefficient Ks, Kr are calculated from the band stray light efficiencies $Es_a$, $Es_b$, $Es_c$ and $Er_a$, $Er_b$, $Er_c$ at which the components of the respective bands a, b, c of the incident lights become stray light, and the integrated band inputs $A_a$, $A_b$, $A_c$ of the respective band components of the incident lights, these parameters being calculated beforehand. Accordingly, the individual band stray light efficiencies $Es_a$, $Es_b$, $Es_c$ and $Er_a$, $Er_b$, $Er_c$ of the dual channel polychrometer 10 can be easily and accurately calculated using the incident lights of sufficient intensity by dividing a visible range (400 to 700 nm) into a relatively small number of bands with wide wavelength widths, and the stray light intensity coefficient Ks, Kr can be calculated using these band stray light efficiencies $Es_a$, $Es_b$, $Es_c$ and $Er_a$, $Er_b$, $Er_c$, with the result that the stray light can be highly accurately corrected.

Further, the stray light distribution $Ss_n$, $Sr_n$ are respectively calculated by the Equations (5) and (6) using the integrated band inputs $A_a$, $A_b$, $A_c$ of the incident lights, the stored band stray light efficiencies $Es_a$, $Es_b$, $Es_c$ and $Er_a$, $Er_b$, $Er_c$ and the standard stray light distribution $S0_n$. Accordingly, it is possible to estimate the stray light distribution $Ss_n$, $Sr_n$ by a simple process and to highly accurately correct the spectral distribution outputs or pixel distribution outputs of the incident lights ($Is_n \rightarrow Is'_n$, $Ir_n \rightarrow Ir'_n$).

Further, the pixel distribution outputs of the incident lights in the respective bands a, b, c are obtained from the differences of the pixel distribution outputs when the incidents lights are caused to transmit through the two sharp-cut longpass filters having high transmittances. Accordingly, the band stray light efficiencies $Es_a$, $Es_b$, $Es_c$ and $Er_a$, $Er_b$, $Er_c$ can be accurately calculated based on these differences.

Further, the integrated band inputs $A_a$, $A_b$, $A_c$ of the incident lights are calculated from the band pixel transmittances $T_{a,n}$, $T_{b,n}$, $T_{c,n}$ of the respective bands a, b, c and the pixel distribution outputs $Is_n$ of the incident light. Accordingly, the integrated band inputs $A_a$, $A_b$, $A_c$ can be calculated by a simple process.

Since the standard stray light distribution $S0_n$ is obtained from the output of the sensor array DAr corresponding to the other incident slit SLr when the sample light Is is incident through the one incident slit SLs using the sensor arrays DAs, DAr arranged in two rows, the standard stray light distribution $S0_n$ can be easily and accurately obtained. This method is particularly effective for the dual channel polychrometer 10 including the sensor arrays DAs, DAr arranged in two rows.

Technologies of various modes are disclosed in this specification as described above. Main ones of these are summarized as follows.

A method for correcting stray light of a polychrometer according to one mode is the one for separating a measurement light into a plurality of wavelength components by a wavelength separating unit, receiving the respective wavelength components by a light receiving unit comprised of a plurality of pixels and calculating spectral intensities of the respective wavelength components and comprises a step (S1, S5) of calculating a relative spectral (pixel) distribution (spectral distribution or pixel distribution, inter-pixel distribution) of stray light (standard stray light distribution $S0_n$) independent of a spectral distribution of an incident light as a standard atray light distribution; a step (S6 to S8, S11 to S13) of calculating intensity coefficient of the stray light (stray light intensity coefficient Ks, Kr) according to a spectral (pixel) distribution (spectral distribution outputs or pixel distribution outputs, inter-pixel distribution) of the incident light; a step (S14) of estimating spectral (pixel) distribution of the stray light (stray light distribution $Ss_n$, $Sr_n$) included in spectral (pixel) distribution of the incident light based on the standard stray light distribution and the stray light intensity coefficient; and a step (S15) of correcting the spectral (pixel) distribution ($Is_n$, $Ir_n$) of the measurement light into ($Is'_n$, $Ir'_n$).

Further, a polychrometer according to another mode comprises a wavelength separating unit for separating an incident light into a plurality of wavelength components, a light receiving unit comprised of a plurality of pixels and adapted to receive lights of the plurality of wavelength components separated by the wavelength separating unit and convert the received lights into an electric signal depending on the plurality of wavelength components and an arithmetic control unit for calculating spectral intensities of the respective wavelength components based on an output of the light receiving unit, wherein the arithmetic control unit estimates spectral (pixel) distribution (spectral distribution or pixel distribution, inter-pixel distribution) of stray light (stray light distribution $SS_n$, $Sr_n$) included in spectral (pixel) distribution outputs (spectral distribution outputs or pixel distribution outputs, inter-pixel distribution outputs) of an incident light based on relative spectral (pixel) distribution of stray light (standard stray light distribution $S0_n$) independent of a spectral distribution of an incident light and obtained beforehand and intensity coefficient of the stray light (stray light intensity coefficient Ks, Kr) calculated according to spectral (pixel) distribution outputs of the incident light, and corrects spectral (pixel) distribution outputs ($Is_n$, $Ir_n$) of the measurement light into ($Is'_n$, $Ir'_n$).

According to the above constructions, the stray light distribution produced by the incident light can be estimated based on the standard stray light distribution ($S0_n$) and the intensity coefficient (Ks, Kr) accurately obtained at a sufficient single level. As a result, the stray light can be more accurately corrected as compared to a conventional case where the stray light distribution is directly estimated from the incident light.

In the case of applying the correction process to the pixel distribution, the stray light can be highly accurately corrected by a simple process unaccompanied by pixel-wavelength conversion.

Further, in the above method for correcting stray light of a polychrometer, it is preferable that the polychrometer comprises a light receiving unit comprised of a plurality of pixels for receiving an incident light separated into the plurality of wavelength components and having a pixel area divided into wavelength bands (bands a, b, c) of specified wavelength widths or pixel widths; and that the stray light intensity coefficient (Ks, Kr) is calculated from precalculated efficiencies (band stray light efficiencies $Es_a$, $Es_b$, $Es_c$ and $Er_a$, $Er_b$, $Er_c$) of components of the respective bands (a, b, c) of the incident light to become stray lights in the light receiving unit and integrated intensities of the respective band components of the incident light (integrated band inputs $A_a$, $A_b$, $A_c$).

According to the above construction, the intensity of the incident light can be increased, for example, by dividing a visible range (400 to 700 nm) into a relatively small number of bands having wide wavelength widths, and the band stray light efficiencies ($Es_a$, $Es_b$, $Es_c$ and $Er_a$, $Er_b$, $Er_c$) of the respective bands (a, b, c) can be highly accurately calculated. Further, since the stray light intensity coefficient (Ks, Kr) can be calculated using the band stray light efficiencies ($Es_a$, $Es_b$, $Es_c$ and $Er_a$, $Er_b$, $Er_c$), the stray light can be, as a result, highly accurately corrected. Furthermore, since an incident light with a sufficient intensity is used, the band stray light efficiencies ($Es_a$, $Es_b$, $Es_c$ and $Er_a$, $Er_b$, $Er_c$) of individual spectral apparatuses can be easily and accurately calculated.

Preferably, in the above method for correcting stray light of a polychrometer, the stray light distribution ($Ss_n$, $Sr_n$) is estimated by an equation: stray light distribution ($Ss_n$, $Sr_n$)=band stray light efficiencies ($Es_a$, $Es_b$, $Es_c$ and $Er_a$, $Er_b$, $Er_c$) integrated band inputs ($A_a$, $A_b$, $A_c$)·standard stray light distribution ($S0_n$). It should be noted that the standard stray light distribution ($S0_n$) is bases of stray light distribution and "·" is an operator of multiplication.

According to the above construction, it is possible to estimate the stray light distribution ($Ss_n$, $Sr_n$) of the incident light by a simple process using the integrated band inputs ($A_a$, $A_b$, $A_c$) of the incident light and the stored band stray light efficiencies ($Es_a$, $Es_b$, $Es_c$ and $Er_a$, $Er_b$, $Er_c$) and standard stray light distribution ($S0_n$) and to highly accurately correct the spectral distribution outputs or pixel distribution outputs ($Is_n$, $Ir_n$) of the incident light ($Is_n \rightarrow Is'_n$, $Ir_n \rightarrow Ir'_n$).

Preferably, in the above method for correcting stray light of a polychrometer, the respective bands (a, b, c) are differential transmission ranges of two sharp-cut long-pass filters having different cutoff wavelengths.

According to the above construction, the pixel distribution outputs of the incident light in the respective bands (a, b, c) can be obtained from differences of the pixel distribution outputs when the incident light was transmitted through the two sharp-cut long-pass filters having high transmittances, and the band stray light efficiencies can be accurately calculated based on these.

Preferably, in the above method for correcting stray light of a polychrometer, the integrated band inputs ($A_a$, $A_b$, $A_c$) of the incident light are calculated from precalculated spectral transmittances or pixel transmittances ($T_{a,n}$, $T_{b,n}$, $T_{c,n}$) of the respective bands (a, b, c) and the spectral distribution or pixel distribution ($Is_n$) of the incident light.

According to the above construction, the integrated band inputs ($A_a$, $A_b$, $A_c$) can be calculated by a simple process.

Preferably, in the above method for correcting stray light of a polychrometer, it is preferable that the polychrometer comprises a light receiving unit comprised of a plurality of pixels for receiving an incident light separated into a plurality of wavelength components; and that the standard stray light distribution ($S0_n$) is obtained from outputs of at least some of pixels of the light receiving unit when an incident light having a wavelength not to be incident on the at least some of pixels is incident.

According to the above construction, the standard stray light distribution ($S0_n$) can be obtained only by causing the incident light having the above wavelength to be incident on an incident slit of a completed spectral apparatus.

Preferably, in the above method for correcting stray light of a polychrometer, it is preferable that the polychrometer comprises a light receiving unit adapted to receive an incident light separated into a plurality of wavelength components and comprised of a plurality of pixels, the pixels constituting a first pixel row for receiving the separated wavelength components and a second pixel row arranged in parallel with the first pixel row at a position where the separated wavelength components are not incident; and that the standard stray light distribution ($S0_n$) is obtained from outputs of the second pixel row when the incident light is incident.

According to the above construction, the standard stray light distribution ($S0_n$) can be easily and accurately calculated. This method is particularly effective for a dual channel polychrometer including two pixel rows.

The present invention has been appropriately and sufficiently described above by way of embodiments with reference to the drawings, but it should be appreciated that a person skilled in the art can easily modify and/or improve the above embodiments. Accordingly, a modified embodiment or improved embodiment carried out by the person skilled in the art should be interpreted to be embraced by the scope as claimed unless departing from the scope as claimed.

What is claimed is:

1. A method for correcting stray light of a polychrometer having at least one sensor array, the method comprising the steps of:
   calculating a relative inter-pixel distribution of stray light independent of a spectral distribution of an incident light as a standard stray light distribution, the incident light received by the at least one sensor array;
   calculating a stray light intensity coefficient according to an inter-pixel distribution of the incident light;
   estimating inter-pixel distribution of the stray light included in inter-pixel distribution of the incident light based on the standard stray light distribution and the stray light intensity coefficient;
   correcting the spectral distribution or pixel distribution of the measurement light based on the inter-pixel distribution of the stray light; and
   outputting the spectral distribution or pixel distribution whose stray light is corrected.

2. A method according to claim 1, wherein the polychrometer further comprises:
   a light receiving unit having a plurality of pixels for receiving an incident light separated into a plurality of wavelength components and having a pixel area divided into wavelength bands (bands) of specified wavelength widths or pixel widths; and wherein the stray light intensity coefficient based on the inter-pixel distribution of the stray light is calculated from pre-calculated band stray light efficiencies as efficiencies of components of the respective bands of an incident light to become stray lights in the light receiving unit and integrated band inputs as integrated intensities of the respective band components of the incident light.

3. A method according to claim 2, wherein the stray light distribution is estimated based on the band stray light efficiencies, the integrated band inputs, and the standard stray light distribution as base of stray light distribution.

4. A method according to claim 2, wherein the respective bands are differential transmission ranges corresponding to two sharp-cut long-pass filters having different cutoff wavelengths.

5. A method according to claim 2, wherein the integrated band inputs of the incident light are calculated from pre-calculated spectral transmittances or inter-pixel transmittances of the respective bands and the spectral distribution or inter-pixel distribution of the incident light.

6. A method according to claim 1, wherein the polychrometer further comprises:
a light receiving unit having a plurality of pixels for receiving an incident light separated into a plurality of wavelength components; and
wherein the standard stray light distribution is obtained from outputs of at least some of pixels of the light receiving unit when an incident light having a wavelength not to be incident on at least some of pixels is incident.

7. A method according to claim 1, wherein the polychrometer further comprises:
a light receiving unit adapted to receive an incident light separated into a plurality of wavelength components and having a plurality of pixels, the pixels arranged as a first pixel row for receiving the separated wavelength components and a second pixel row arranged in parallel with the first pixel row at a position where the separated wavelength components are not incident; and
wherein the standard stray light distribution is obtained from outputs of the second pixel row when the incident light is incident.

8. A polychrometer, comprising:
a wavelength separating unit for separating an incident light into a plurality of wavelength components;
a light receiving unit comprised of a plurality of pixels and adapted to receive lights of the plurality of wavelength components separated by the wavelength separating unit and convert the received lights into an electric signal depending on the plurality of wavelength components; and
an arithmetic control unit for calculating a spectral distribution of the incident light based on an output of the light receiving unit,
wherein the arithmetic control unit estimates inter-pixel distribution of stray lights included in inter-pixel distribution outputs of an incident light based on preobtained and prestored relative inter-pixel distribution of stray light independent of a spectral distribution of an incident light and stray light intensity coefficient calculated according to inter-pixel distribution of the incident light, and corrects the inter-pixel distribution of the incident light based on the inter-pixel distribution of the stray light.

* * * * *